United States Patent Office 3,525,389
Patented Aug. 25, 1970

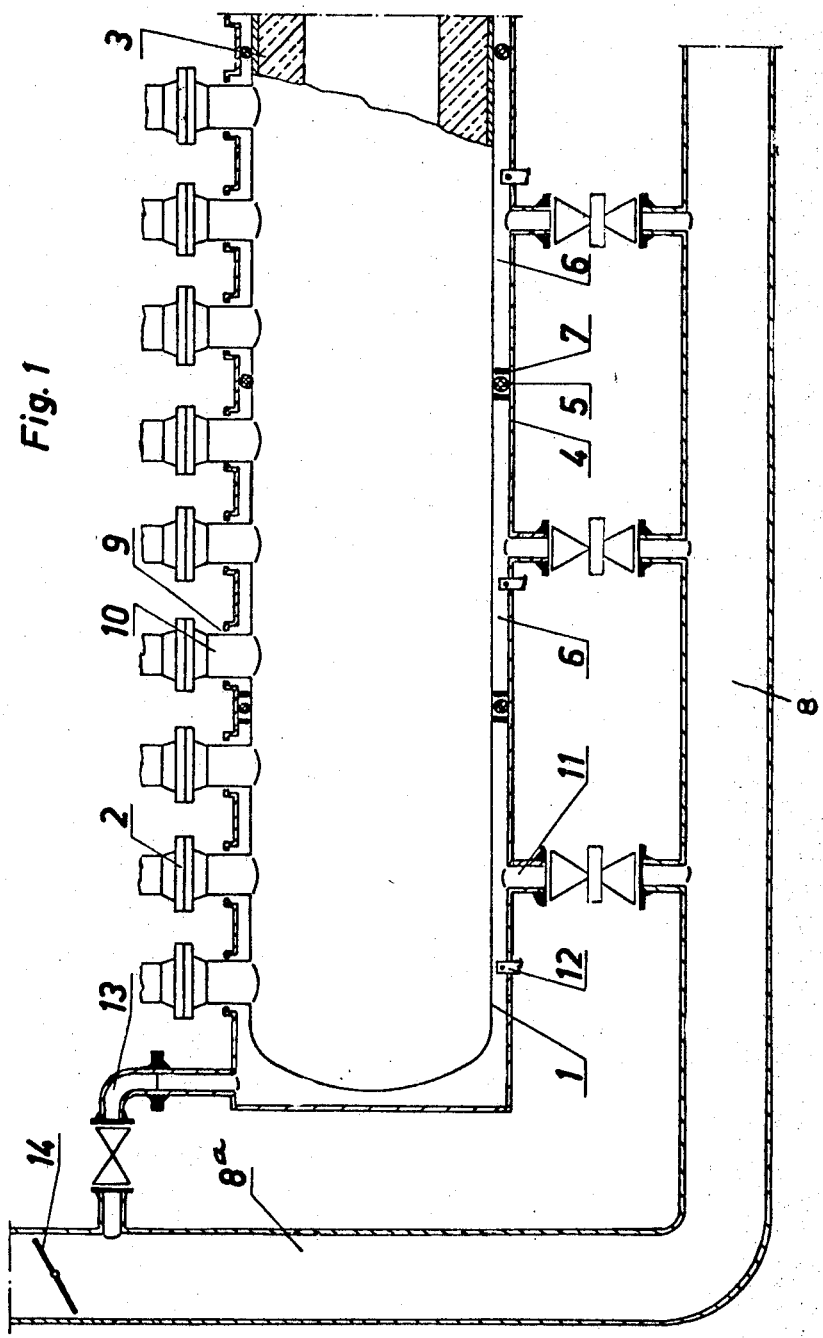

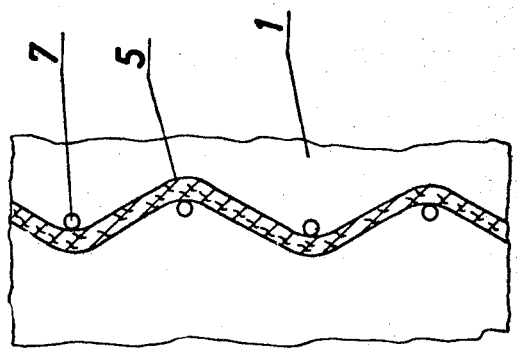
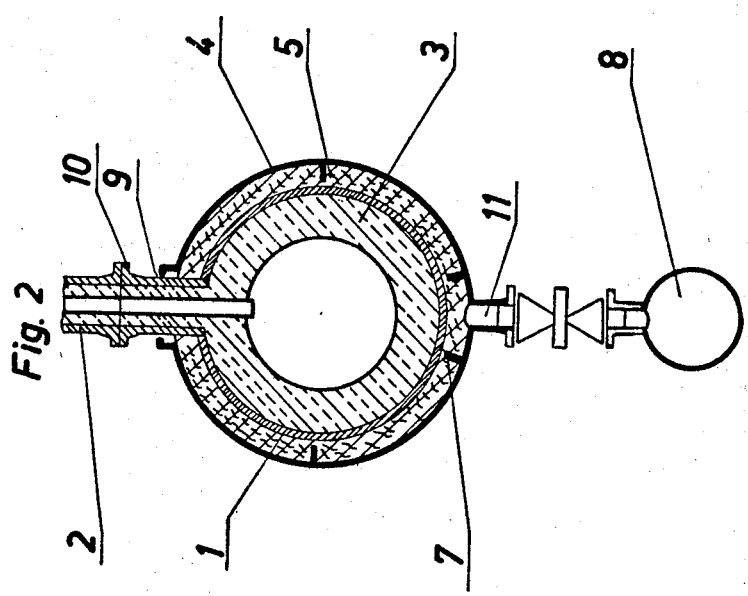

3,525,389
PROTECTION AGAINST UNDESIRABLE TEMPERATURES IN HOT GAS CONTAINERS
Paul Mevenkamp, Lichtendorf, and Hans-Dieter Marsch, Dortmund, Germany, assignors to Friedrich Uhde G.m.b.H., Dortmund, Germany, a corporation of Germany
Original application Oct. 24, 1967, Ser. No. 677,666. Divided and this application Mar. 26, 1969, Ser. No. 810,496
Int. Cl. F28f *19/00*
U.S. Cl. 165—134        6 Claims

ABSTRACT OF THE DISCLOSURE

Inside insulated container for conveying hot gas has an outside radiation cover which is spaced from the walls of the container to provide a space which is sub-divided into chambers separated one from another. The chambers are connected to a common chimney and they provide temperature measuring locations. The intake points for the air current are so arranged that predetermined portions of the container are cooled by the intake air.

CROSS REFERENCE TO RELATED APPLICATION

This application constitutes a division of the application of Paul Mevenkamp and Hans-Dieter Marsch, Ser. No. 677,666, filed Oct. 24, 1967 and entitled Protection Against Radiation for Hot Gas Containers.

BACKGROUND OF THE INVENTION

It is known to provide containers conveying hot gas with an inner insulation for the protection of the lining. This has the advantage that the container can be made of carbon steel instead of high-alloyed steel, with which at the same time there results significantly less heat expansion in the container walls.

Additionally it is known, that the container is surrounded by a protection against radiation, in such manner that between the container and radiation protection a space is present. By means of this space, it is insured that the container wall has a somewhat uniform temperature and cannot be cooled nonuniformly through influences of weather.

It is known that the insulating effect of the insulating layer decreases during the course of the operating time, be it by means of the natural decrease of the wall thickness of the insulation or by means of formation of cracks in the insulation. From this it follows that the container wall is heated beyond the permissible extent.

SUMMARY OF THE INVENTION

The present invention is based upon the problem of increasing the reliability of such an inside insulated container and to prevent, at places of intense local heating, an overheating of the container wall. For this, the container conveying the hot gas is provided with a protection against overheating, in this way, that by means of the space or cavity, air is sucked in through determined air slots in the radiation protection, flows along the container wall and passes through predetermined outlets again into the outer air. The inlet points of the current of air are arranged appropriately so that the intake air preferentially cools predetermined portions of the container.

Additionally, the space or cavity is divided by means of tape or packing filaments, which are fixed by pins or the like, into individual chambers, so that it is further possible to attain a desired temperature distribution along the container wall. The chambers are to advantage attached to a common chimney which has natural or artificial draft.

In order to control the temperature in the chambers and accordingly the temperature of the container wall, points of temperature measuring are provided in the chambers. Through these points the extent or measure of the air passage per chamber may also be controlled so that undesirable increase in temperature of the container wall is prevented.

BRIEF DESCRIPTION OF THE DRAWINGS

FIG. 1 is a diagrammatic view in vertical section of a collecting pipe under a steam reforming furnace.

FIG. 2 is a transverse sectional view of the collecting pipe and chimney; and

FIG. 3 is a fragmentary view of the sealing tape disposed between the pipe wall and the radiation protection.

DESCRIPTION OF PREFERRED EMBODIMENT OF THE INVENTION

A metallic collecting pipe or container 1 for a plurality of vertically arranged reformer tubes 2 is provided with inner thermal insulation 3, which is so dimensioned that no condensation forms on the inner wall of the pipe. The pipe wall temperature necessary in this connection is about 200° C. The collecting pipe 1 is surrounded by an outwardly spaced radiation protection or cover 4 of metal. The hollow space between the pipe wall 1 and the cover 4 is subdivided into chambers 6 by flexible sealing tape 5. The tape 5 passes undulatingly about pins 7, as shown on FIG. 3.

If the chambers 6 become overheated, air is drawn out of the chamber or space located below the steam reforming furnace (not shown) through annular gaps 9 about tuyeres 10 of the collecting pipe, and flows around the wall of the collector pipe 1, cools it and passes through valve controlled outlets 11 into an outlet conduit 8 leading to a chimney 8a. The chimney 8a has a damper 14 for controlling the draft in the usual manner.

Due to the fact that the space between the container or pipe wall 1 and the radiation protection cover 4 is divided into chambers 6, each of which has its own valve controlled outlet 11 and the chambers are provided with temperature measuring points 12 for thermometer reception, the temperature in each chamber may be determined and adjusted and accordingly the temperature of the adjacent wall section of the pipe can be controlled in a predetermined manner.

It will thus be seen that the pipe or container 1 is surrounded by a plurality of chambers 6, which have a common chimney 8a, and the intake points 9 for the current of air are so arranged that predetermined portions of the container are preferentially air cooled. With natural draw an additional valve controlled pipe 13 from the container cover 4 to the chimney 8a is necessary, through which the latter is put into action.

What we claim is:

1. In a device of the class described, a heated gas conducting container, thermal insulation for the inside of said container, a metallic cover enclosing said container and spaced from the outer wall thereof to provide a hollow space surrounding same, a series of spaced tuyeres, projecting from said container through the adjacent walls of said cover, means providing a plurality of inlet openings arranged along a wall of said cover through which air can be drawn in from the outside to flow about said container, means on a remote wall of said cover providing a series of outlet openings through which air may escape from said cover after passing about the outer walls of said container, and means to generate a flow of air from said inlet openings to said outlet openings.

2. In a device of the class described as claimed in claim 1, comprising means for separating the hollow space between said cover and container into a plurality of chambers, there being air inlets for each chamber and an air outlet for each chamber, and said flow generating means being common to said air outlets.

3. In a device of the class described as claimed in claim 1, comprising pin and packing filaments members disposed in the space between said cover and container to provide a plurality of chambers through which air passes from said inlet openings to said outlet openings, and valves controlling said outlet openings.

4. In a device of the class described as claimed in claim 2, valve means controlling each outlet, said flow generating means comprising a pipe common to said valve controlled air outlets, and a chimney for said pipe, thereby to create a draft in said pipe.

5. In a device of the class described as claimed in claim 4, comprising openings around said tuyeres constituting said inlet openings.

6. In a device of the class described as claimed in claim 4, comprising means for each chamber to determine on the outside of said cover the temperature obtaining within each chamber.

References Cited

UNITED STATES PATENTS

| 2,968,894 | 1/1961 | Hess | 165—134 |
| 3,318,374 | 5/1967 | Block | 165—134 |

LLOYD L. KING, Primary Examiner

T. W. STREULE, Assistant Examiner

U.S. Cl. X.R.

266—30, 32